United States Patent [19]

Meehan

[11] Patent Number: 5,548,727
[45] Date of Patent: Aug. 20, 1996

[54] SYSTEM FOR SELECTIVELY USING DEFAULT PROTOCOL WITHOUT NEGOTIATION FOR FIRST REGULAR COMMUNICATION AND APPROPRIATE PROTOCOL AFTER RECEIVING PROTOCOL INFORMATION EMBEDDED IN THE ESTABLISHED COMMUNICATION

[75] Inventor: Patrick Meehan, Leopardstown, Ireland

[73] Assignee: International Business Machines Corporation, Armonk, N.Y.

[21] Appl. No.: 95,575

[22] Filed: Jul. 19, 1993

[30] Foreign Application Priority Data

Nov. 17, 1992 [GB] United Kingdom .................. 9224076

[51] Int. Cl.$^6$ ............................. G06F 13/14; H04L 12/00
[52] U.S. Cl. .................... 395/200.13; 370/85.4; 370/85.6; 370/99; 364/240.8; 364/241.8; 364/242.8; 395/500
[58] Field of Search ............................. 370/92; 358/440, 358/450; 395/200.01, 200.02, 200.03, 200.08, 200.1, 200.15, 200.18, 831, 500

[56] References Cited

U.S. PATENT DOCUMENTS

| | | | |
|---|---|---|---|
| 4,961,185 | 10/1990 | Sawada | 370/79 |
| 4,975,830 | 12/1990 | Gerpheide | 364/200 |
| 5,008,879 | 4/1991 | Fischer et al. | 370/85.2 |
| 5,021,943 | 6/1991 | Grimes | 395/800 |
| 5,062,108 | 10/1991 | Bales et al. | 370/110.1 |
| 5,077,732 | 12/1991 | Fischer et al. | 370/85.4 |
| 5,095,445 | 3/1992 | Sekiguchi | 364/514 |
| 5,189,525 | 2/1993 | Kotani | 358/407 |
| 5,251,318 | 10/1993 | Nitta et al. | 395/725 |
| 5,276,898 | 1/1994 | Kiel et al. | 395/800 |

FOREIGN PATENT DOCUMENTS 0279232  1/1988  European Pat. Off. .

OTHER PUBLICATIONS

Second Edition, Internetworking with TCP/IP, vol. 1, Principles, Protocols, and Architecture by Douglas E. Comer, 12 pages.

*Primary Examiner*—Thomas C. Lee
*Assistant Examiner*—Anderson I. Chen
*Attorney, Agent, or Firm*—Joscelyn G. Cockburn

[57] ABSTRACT

The present invention provides a computer network having a plurality of nodes which can communicate with each other over the network. Of the total number of nodes, a set of them are programmed to communicate via a first or a second protocol, whilst at least one node is programmed such that it can only communicate via the first protocol and not the second protocol. Each node in the set comprises a receiving means, responsive to input from the plurality of nodes in the network, for registering the 'states' of the software levels on those nodes; these states are stored in a storage device within the node. Further each node in the set has an indication means for producing an output signal indicating its own state, this output signal being transparent to the at least one node that can only communicate via the first protocol. When a node from the set is used as a transmitting node for communicating with a receiving node selected from any of the plurality of nodes, the indication means of this transmitting node produces the output signal during such communication. The communication protocol for such communication is chosen to be the second protocol if the state of the receiving node as stored in the storage device of the transmitting node indicates that the receiving node is a member of the set.

5 Claims, 3 Drawing Sheets

OUTBOUND FROM AND INBOUND TO NODE a

DATA FILE  NEW VERSION NODE

CONTROL FILE  OLD VERSION NODE

SYSTEM FOR SELECTIVELY USING DEFAULT PROTOCOL WITHOUT NEGOTIATION FOR FIRST REGULAR COMMUNICATION AND APPROPRIATE PROTOCOL AFTER RECEIVING PROTOCOL INFORMATION EMBEDDED IN THE ESTABLISHED COMMUNICATION

The present invention relates to a computer network, and in particular to a network comprising a plurality of nodes which can communicate with each other over the network.

The computer nodes in such a network typically have software installed on them to control the operation of the nodes and their interaction with each other. The supplier of the software may periodically upgrade that software, causing new 'levels' to be distributed. These new levels may be installed on some, but not all, of the nodes in the network. Even if it is intended that the new level be installed on all nodes in the network there will be a change-over period where some nodes have the new level and some have the old level.

Hence new levels of a software product must frequently co-exist and communicate with older levels of the product across a computer network to ensure upward compatibility. An old level of a product cannot in general accept any significant changes in the way data is communicated to it and will generally reject or ignore the data if it is presented in a different manner.

A new software level may provide means for communicating via a new communications protocol, and hence a node having the new software level can use the new protocol when communicating with a different node also having the new software level. However this node must know that the node which is to receive the data is at the same software level as itself. If it doesn't have this knowledge then it must continue to communicate to its counterparts on all nodes using the communications protocol of the old software level. In the absence of this knowledge, significant changes to communications between nodes having the same software level is not possible.

One technique which has been used to overcome this problem involves the management of information centrally, with subsequent distribution to nodes of the network. IBM Technical Disclosure Bulletin (TDB) Vol 34, No 5, October 1991 entitled "Software Upgrade through Local Area Network (LAN)" describes a particular implementation of this technique. This article points to the problem that when it is necessary to upgrade the LAN programs in each workstation (of which there may be hundreds on the LAN), it is very time consuming for the network administrator to carry diskettes and install the software on each workstation individually. The solution proposed in the TDB article is to have the new software installed on a LAN File Server, and have each workstation then run a program to copy needed files from the file server to the workstation and modify the configuration of the workstation accordingly.

U.S. Pat. No 5,005,122 describes a network including a plurality of nodes which communicate over a communications link, the nodes being either client nodes which are used by users, or server nodes. At least one of the server nodes is a management server node. One of the features of the network is a software distribution service which involves the management server node transmitting a message to a software distribution server node to initiate the distribution service. Hence this patent describes a system similar to that discussed above where software management is handled centrally for subsequent distribution to the client nodes.

IBM products such as PROFS or OV/VM currently operate in a similar manner to that described above. When a node changes from one software level to another, an administrator changes its REMLOC FILE to reflect this and transmits this file to a central location. The central location must then transmit this file to all its nodes in the network and each recipient node receives the REMLOC FILE and replaces the old one, typically as part of an overnight process. It is understood that the distribution from the central location is currently done once every week. Hence the nodes receive knowledge about the states of other nodes in the network from a central location, and such knowledge is updated at set intervals, eg. every week.

This technique has two main disadvantages. Firstly it involves the central administration of the states of all the nodes in the network so that accurate information can be transmitted to all the nodes, which proves to be costly both in manpower and time. Secondly it does not solve the problem of how to coordinate and synchronise changes on nodes. Since the information concerning changes on particular nodes is not transmitted to the other nodes as soon as the changes are made, the benefits of such changes cannot be immediately realized, and further, since each node will in the intervening period have inaccurate information errors in communication can occur.

A different technique known as 'bundling' bypasses, rather than solves, the problem created by one node net knowing the software level of another node with which it wishes to communicate. In this technique data files are bundled at transmission, and then separated by a type of filter service machine attached to the receiving node; the unbundled data is then passed on to the receiving node. 'Bundling' involves appending the data files end-to-end. The transmitting node does not have any information about the software levels of receiving nodes and so bundles all the files together, even though a node with a new software level might not require all these files. The filter service machine then unbundles the files and passes on the required files to the attached receiving node.

This has been shown to be a very expensive solution as it requires an additional service machine to be provided for each node to act as a sort of converter, this extra machine only being useful if bundling is desired. Further 'bundling' has only limited applicability as it is only useful if the desire is to improve communications merely by combining ALL of the old data together in one packet. The improvement in communication is due to the total number of network files being reduced, thus resulting in improved throughput; however it is worth noting that there is still the same quantity of data passing through the network. For the above reasons the bundling technique is not generally favoured.

European Patent Application 0,361,607 relates to a telecommunications network comprising a number of units interconnected by means of transmission lines. When a new unit, which has not yet been tested in a network environment, is to be added to the network and it is intended to adapt the software available in the existing units, problems may occur in the control communication. The invention aims to solve this problem by enabling the network to test different communications aspects between different nodes. The units involved in establishing basic communication between two units are always arranged in a master-slave combination, and communicate by way of a scout message followed by a hello message which contains the pertinent information as to whether communication between specific pairs of units is possible at particular communication levels. All units will be guaranteed to be able to handle the scout and hello message since all units are at the same software level. At aspect level 1 operator-unit communication is checked, at aspect level 2 the channels between the units are checked, and at aspect level 3 the operational use of the units are checked. Communication between a pair of units using a specific aspect of communication is only allowed if there is compatibility at the aspect level involved, and communication between these units already takes place at a lower aspect levels.

This communication technique may work well for the situation described in EP-A-0,361,607 but has disadvantages when applied to more general situations. Firstly, when using the above technique, the communicating nodes must be arranged in a master-slave arrangement. Secondly all units must be able to understand the scout and hello messages, and in order to achieve this certain nodes may need to be altered. However in general such alteration will not be possible because, for example, the nodes will already be in production and in the market place.

It is an object of the present invention to provide a network wherein a node can collect information about the software levels installed on other nodes in the network in a more efficient manner than those proposed by the prior art.

Accordingly the present invention provides a computer network having a plurality of nodes which can communicate with each other over the network, the network characterised in that: the plurality of nodes includes a set of nodes programmed to communicate via a first or a second protocol, and at least one node programmed to communicate via said first protocol but not said second protocol, and each node in said set comprises: a receiving means, responsive to input from said plurality of nodes, for registering the states of said plurality of nodes; a storage device for storing said states; an indication means for producing an output signal indicating the state of the node, said output signal being transparent to said at least one node; a node in said set being operable as a transmitting node for communicating with a receiving node selected from said plurality of nodes, said indication means of said transmitting node producing said output signal during such communication; the communication protocol for such communication being the second protocol when the state of the receiving node as stored in the storage device of said transmitting node indicates that said receiving node is a member of said set.

In preferred embodiments, if the state of said receiving node is not known, or the state indicates that the receiving node is said at least one node, said transmitting node communicates using said first protocol. If the receiving node is said at least one node, then preferably the receiving node recognises the communication via said first protocol, and ignores said output signal.

There are several ways in which the output signal can be transmitted with the general communication data. For instance it might be sent as a separate data stream or instead may be incorporated with the communication data in some manner. In preferred embodiments, the output signal is placed in a previously redundant byte in the communications data sent from the transmitting node to the receiving node.

Viewed from a second aspect the present invention provides a method of operating a computer network having a plurality of nodes which can communicate with each other over the network, the plurality of nodes including a set of nodes programmed to communicate via a first or a second protocol, and at least one node programmed to communicate via said first protocol but not said second protocol, the method being characterised by the steps of: each node in said set extracting and storing information about the state of the other nodes in said plurality of nodes when such nodes communicate with it; each node in said set being programmed to produce an output signal indicating the state of that node whenever that node communicates to another node, said output signal being transparent to said at least one node; communicating from a transmitting node, selected from said set of nodes, to a receiving node, selected from said plurality of nodes; producing said output signal during such communication; such communication using the second protocol when the state of the receiving node as stored by said transmitting node indicates that said receiving node is a member of said set.

This technique of a node with a new software level acquiring knowledge about the software levels on other nodes is conducted entirely within the node and does not depend on any administrative work by systems personnel on each participating node. The acquisition of this knowledge is therefore dynamic.

The present invention enables improvements to be made in the way that one node communicates with other nodes in a network, thus having significant benefits in the area of performance and network traffic. In practice, a network in accordance with the invention has been shown to have no need for any customer administration in its operation.

The present invention will be described further, by way of example only, with reference to an embodiment thereof as illustrated in the accompanying drawings, in which.

Figure 1:
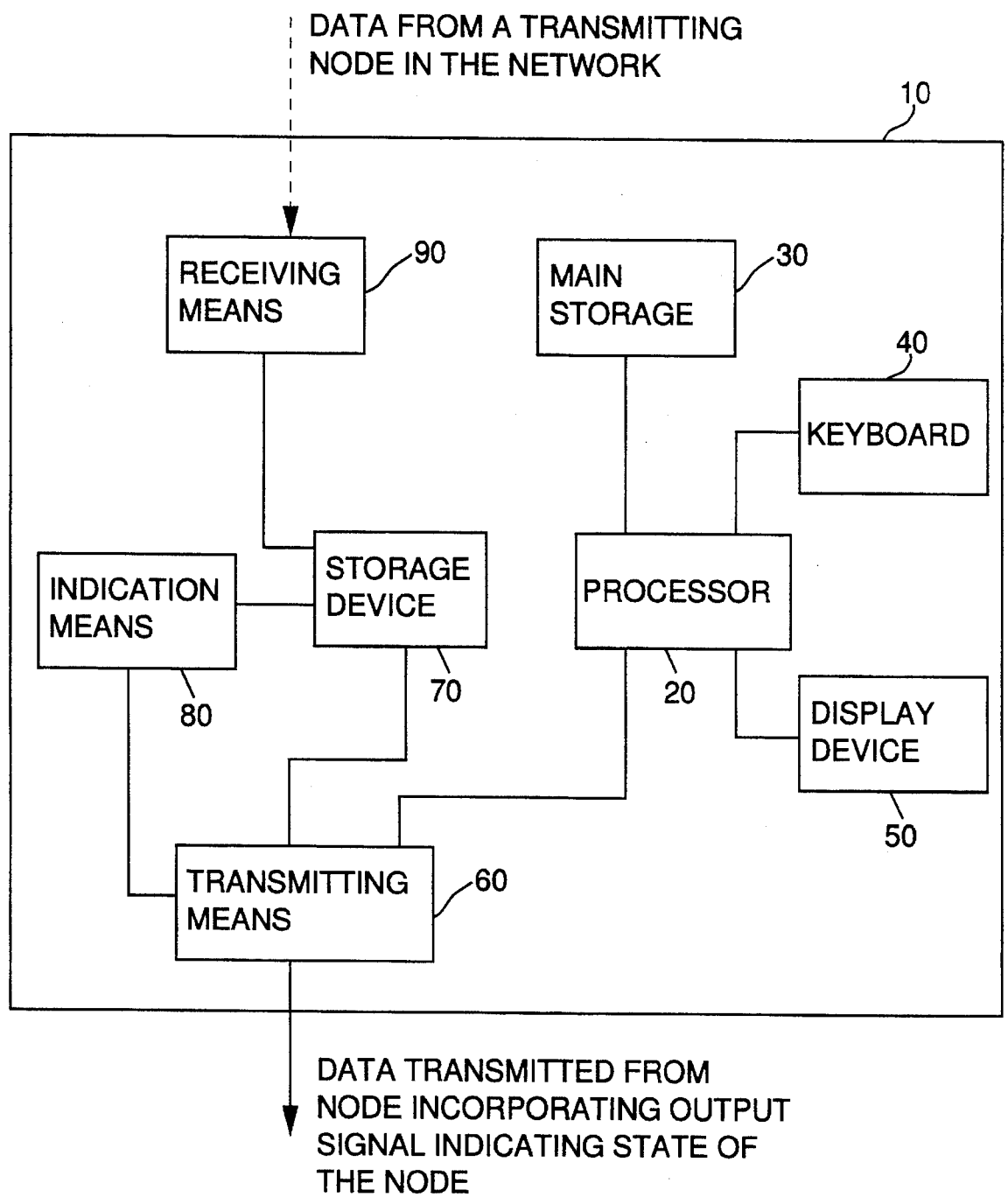
FIG. 1 is a block diagram illustrating the construction of a node in the network of the preferred embodiment, which has the new software level installed upon it.

In the preferred embodiment of the present invention the software levels installed on the various nodes of the network relate to the management of electronic forms. By installing such software on nodes of a network on-line forms can be designed, these forms can be completed, the form data can be routed electronically across the network to other nodes, and electronic signature can be used as a means of taking some action on the form.

In many instances the electronics management software is installed in a multi-node situation, sometimes with a mixture of new and old levels of software.

When a user fills in a form, that form may have to be approved by a sequence of approvers on different nodes in a network. For this reason, the form data and pertinent control data is transmitted from one node to another. The means of communication across the network is therefore through a set of data files.

When the receiving node is alerted to the data arrival, it will typically assume a particular format and structure for the incoming data. If that layout is different than expected, it will purge or ignore the data.

For example, if the transmitting node (where the form is initially filled in for subsequent approval) changes the format of the outgoing data in accordance with a protocol introduced as part of a new software level, the receiving node (where approval is expected to take place) will not recognise the data if it does not have the new software level installed on it. Hence it will not take the correct action on the data.

Therefore, if during the development of a new software level of a product, one changes the communication data to be of a different format and that level of the product transmits that data to a receiving node which runs an older level of the software product, the latter will be unable to recognise the incoming data.

However, if the new software level is also changed to receive data in a different format and the product at this new level on one node communicates to the product at the same level on a different node, then the communications is of course successful.

Therefore, as mentioned earlier, the key to being able to implement improved communications available through the latest software level of a product, whilst still being able to work with previous levels of the product, is for the latest software level to retain up-to-date information about the software level of the product installed on the node with which it wishes to communicate.

In the preferred embodiment a new software level of a product on one node in a network can use a previously redundant byte in the communications data or, in the absence of such a byte, a new stream of data to inform the product on the target receiving nodes that it is at the latest software level.

If a receiving node is at the same software level then it can exploit this knowledge when it is subsequently communicating with that node and thus improve that communication.

If a recipient node is at an older software level, it will, in preferred embodiments, ignore the redundant byte or new data stream and communicate successfully in the old way with that node.

FIG. 1 is a block diagram illustrating the construction of a node in the network of the preferred embodiment, the node having the new software level installed upon it. The node 10 has a processor 20 coupled with a main storage 30 for handling the processing of electronic forms on that node. For example, a user can use the keyboard 40 to instruct the processor 20 to retrieve a particular form from main storage 30 and to display that form on the display device 50 so as to aid the completion of that form by the user.

Once the form has been completed the user may wish to pass it on to another person for review, sign-off, etc. If that other person has access to a node on the network then the user can communicate data representing the completed form to that node (hereafter referred to as the receiving node). To communicate the data, such data is passed by the processor 20 to a transmitting means 60 which has access to a storage device 70 containing details of the states of other nodes in the network. In this context the "state" of a node refers to the level of the software resident on that node.

Based on the information retrieved from the storage device 70 the transmitting means 60 decides which communication protocol to use when sending the data to the receiving node. If this receiving node has the new software level resident on it, the transmitting means will communicate using the new protocol. If the receiving node only has the old software level of the product then the transmitting means will communicate using a protocol recognisable by the old software level of the product. If the state of the receiving node is not known the transmitting means must assume that the receiving node only has the old software level installed thereon, and so must communicate using a protocol recognisable by the old software level.

Irrespective of which communication protocol is chosen, the indication means 80 generates an output signal indicating the state of the user's node, and this information is transmitted by the transmitting means along with the form data generated by the user. In preferred embodiments the output signal is placed in a previously redundant byte in the communications data. By such an approach the output signal is transparent to the old software level of the product; such a product would just ignore the output signal since it had always ignored the redundant byte. However, in the absence of such a redundant byte, the output signal can be contained in a new stream of data communicated to the receiving node with the forms data, and chosen to be transparent to the receiving node.

When the node 10 receives data from another node acting as a transmitting node, a receiving means 90 within node 10 searches the incoming data for any output signal included by the transmitting node and giving the state of that transmitting node. The receiving means then stores that state information in the storage device 70 for subsequent use by the transmitting means when communicating back to the transmitting node.

Figure 2:
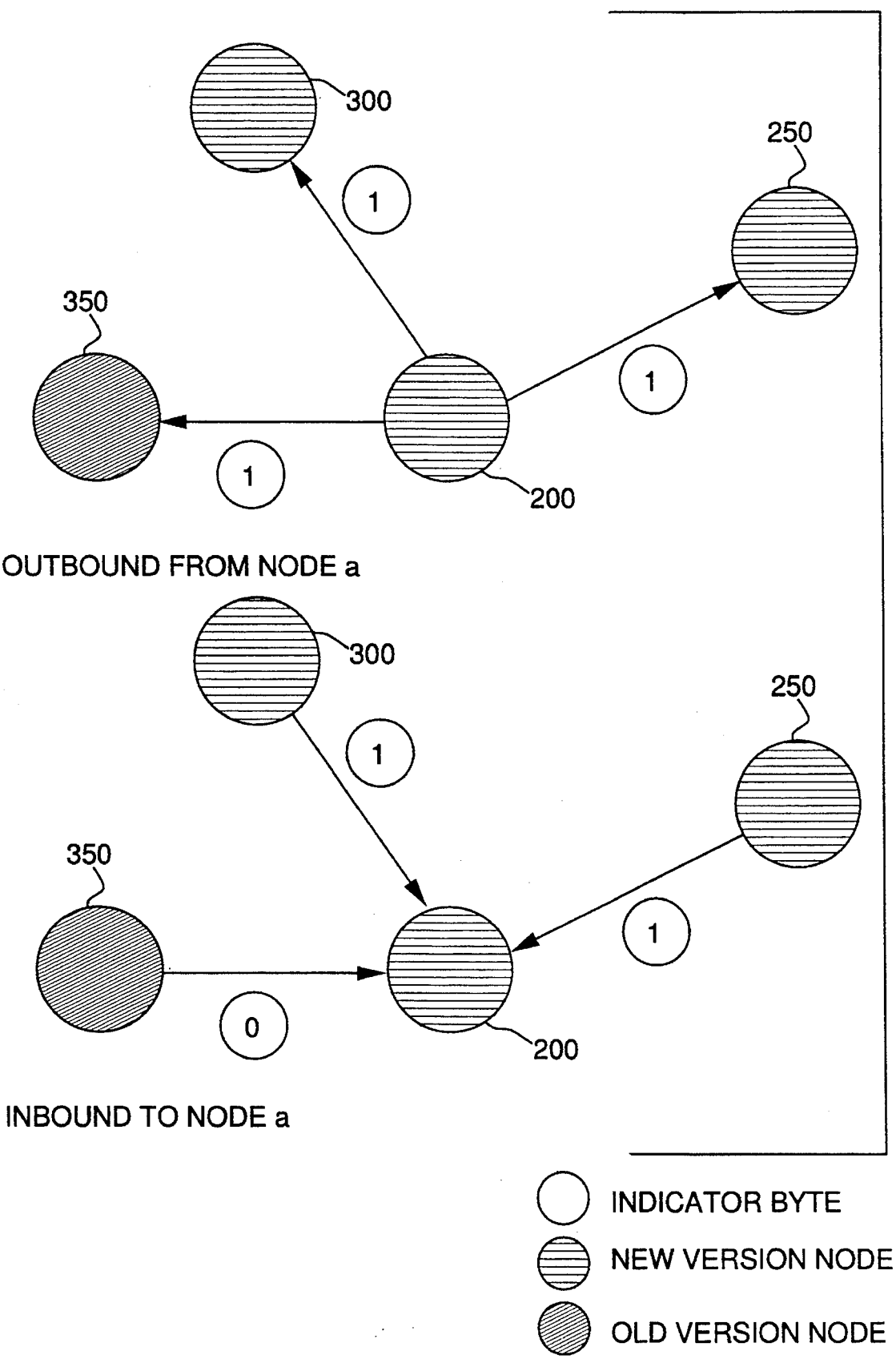
FIG. 2 illustrates how a node with the new software level installed thereon acquires information about the software levels resident on other nodes in the network.

FIG. 2 shows four nodes forming part of a network. In the electronic forms management software of the preferred embodiment a 'control file' is used when communicating between different nodes. A 'control file' is a file which contains certain control information about a separate data file and enables a logical association between the two files. Using the protocol defined by the old software level, this control file has a byte defined within it which is not used by the receiving node.

When the software product was updated the resulting new software level enabled communication via a different protocol, in which this redundant byte is used to contain the output signal from indication means 80, indicating to receiving nodes that the transmitting node is at the new software level. In FIG. 2 this extra byte is referred to as the indicator byte.

If the indicator byte within the communications data is set to one, then the initiating, or transmitting, node is a node with the new software level of the electronic forms management product. From FIG. 2 node 200 is at the new software level and so sets the indicator byte to one when transmitting communications data to the receiving nodes 250, 300, and 350. These receiving nodes process the control file as usual. If the receiving node is at an older level of the product, it simply ignores the indicator byte as it always did. In FIG. 2 node 350 is at the old level and so ignores the indicator byte.

If the receiving node has the new software level of the product installed, then it will have the receiving means 90 which is designed to look at the indicator byte in the control file and, based on the information in the byte, determine whether the transmitting node has the new software level of the product or not. It then holds or replaces that information about that node in storage. In FIG. 2, nodes 250 and 300 have the new software level of the product installed. In the "outbound case" from Node 200 illustrated in FIG. 2, all the paths have the indicator byte set to one. Even if Node 200 knows from the information in storage device 70 that Node 350 has the old software level, it still communicates to it with the indicator byte set to one just in case Node 350 has been upgraded since the information about node 350 in the storage device 70 of node 200 was stored.

In the "inbound case" to Node 200, also shown in FIG. 2, as a result of the communications from Nodes 250, 300 and 350 Node 200 now has the following key information, which it retains in storage device 70:

1. Nodes 250 and 300 are at the same software level as itself and any future communication it has with any of these nodes can exploit this knowledge. It should be noted that exploitation of this knowledge has already resulted in significant performance improvements for the nodes handling this communication together with reductions in the overall network traffic. Further exploitation can lead to even more significant improvements. In the prior art, previous attempts to reduce the network traffic between participating nodes have been severely hampered by the migration problem addressed by the preferred embodiment of the present invention.

2. Node 350 is not at the same level level and any future communication will use the communication protocol recognisable by the old software level.

Figure 3:
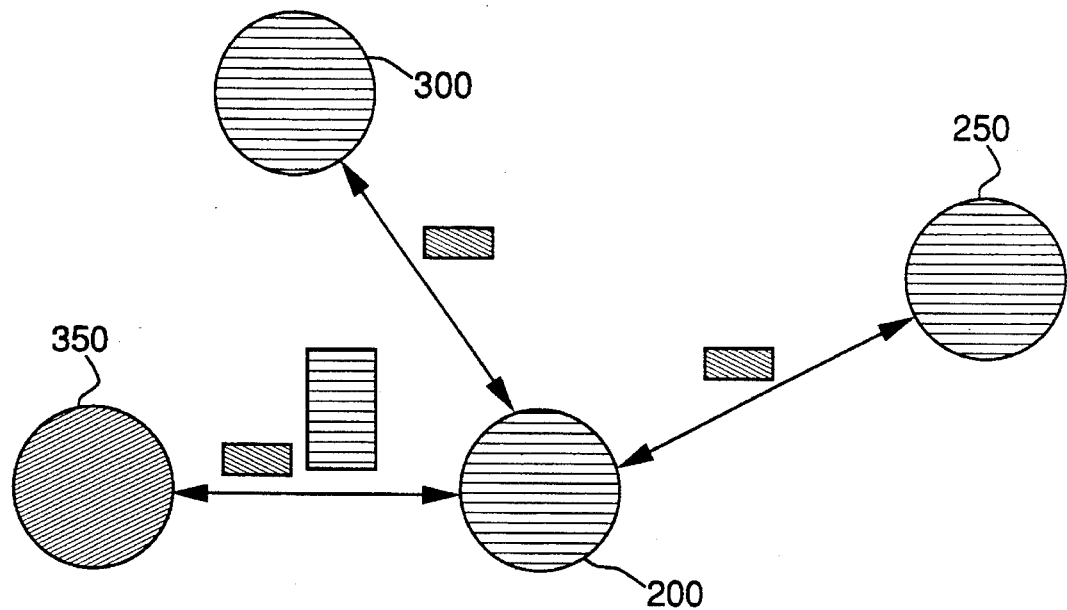
FIG. 3 illustrates how nodes in the network of the preferred embodiment can exploit the knowledge about other software levels so as to communicate in a more efficient manner.
Figure 3:
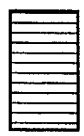
Figure 3:
Figure 3:
Figure 3:

Having discussed how the knowledge about the software levels on other nodes is acquired by a node with the new software level installed, an example will now be discussed with reference to FIG. 3, illustrating how nodes in the network of the preferred embodiment can exploit the knowledge about other software levels so as to communicate in a more efficient manner.

In this particular example, Node 200 has established information about the software levels on the other nodes in the network and all the other nodes have established information about Node 200.

Previously when all the other nodes inter-communicated, both a data file and a control file were always transmitted between the nodes even if there was no change to the data and the data file transmission was effectively redundant.

However in the network of the preferred embodiment, Node 200 knows that Nodes 250 and 300 are at the same software level as itself and they know that Node 200 is at their level. Nodes 200,250 and 300 can hence change the protocol of their inter-communications. In the preferred embodiment, using the new protocol, they need only transmit the control file as shown in FIG. 3, hence reducing network traffic, improving performance and simplifying the overall processing.

Nodes 200 and 350 continue to inter-communicate using the protocol established by the old software level because Node 350 is at the old software level and would reject any change in its communications interface with Node 200.

It is worth noting that if at some later stage Node 350 upgrades to the new software level of the product, then as soon as it communicates with Node 200 as part of its normal processing, Node 200 will notice that the indicator byte is set to one, and subsequent communication between nodes 200 and 350 can take advantage of the improved inter-communication provided by the new communication protocol.

The above described technique offers considerable potential for future development of new software levels of products that provide for communication across a network. No customer administration of control files is required, and so the technique proves to be very cost effective and reliable.

Further with the computer network of the preferred embodiment the indicator byte can be used in a variety of different ways, in addition to signifying the software level of the node transmitting the indicator byte with its communication data. For instance in the example illustrated in FIG. 3, if the indicator byte has a value of 'x' then this might be interpreted to indicate that the transmitting node has the latest software level installed, but that the data file will be transmitted separately. If however the indicator byte had a value of 'n' this might signify that the transmitting node has the latest software level installed and that the data file is not being sent.

As another example there may well be three or more software levels distributed amongst the nodes of the network. For the sake of clarity lets consider three levels, namely level A (old), level B (revised), and level C (latest revision). As already discussed in the description of the preferred embodiment, a network in accordance with the preferred embodiment will enable level B to build up a knowledge of the levels on the other nodes (be they A or B) during the process of normal communication. If level C is introduced into the system and the indicator byte produced by level C has a different value (eg. 2) to the indicator byte produced by level B (eg. 1), then level C will be able to acquire knowledge about all the other nodes on the system.

For instance when a transmitting node X at level C first communicates with other nodes in the network, it will communicate at the old level but will include an indicator byte of value '2'. If the receiving node Y is at level A it will just ignore the indicator byte as before. If the receiving node Y is at level C it will recognise the indicator byte and will communicate at the latest revised level during return communication with the transmitting node. If, on the other hand, the receiving node Y is at level B it will not recognise the indicator byte with a value of "2" and will assume that the transmitting node is at the old level. However, when communicating back to the transmitting node X, this Level B node Y will include an indicator byte of value "1" with the communications data. Node X will recognise this indicator byte and will subsequently communicate to the Level B node Y using the Level B protocol and using an indicator byte with a value of "1". If node Y later upgrades to level C then node X will recognise the new indicator byte of value '2' sent by node Y, and subsequent communication between nodes X and Y will take place using the communications protocol of level C.

Hence it will be apparent to a person skilled in the art that the present invention has application in a network with multiple software levels so as to improve communication between nodes.

I claim:

1. A computer network having a plurality of nodes which communicates with each other over a network, a communication involving the transfer of data from a transmitting node to a receiving node, the plurality of nodes including a set of nodes programmed to communicate via a first or a second protocol, the plurality of nodes further including at least one node programmed to communicate via said first protocol but not said second protocol, and each node in said set comprising:

a storage device for storing states of the plurality of nodes;

each node in said set being arranged that, when acting as a transmitting node, accessing the storage device for determining the state of the receiving node;
      (a) if the state of said receiving node in the storage device is not known, or the state indicates that the receiving node is said at least one node, the communication protocol is the first protocol;
      (b) if the state of the receiving node is a member of said set, the communication protocol is the second protocol;

indication means, operative when the node is acting as a transmitting node, for producing an output signal indicating state of the transmitting node, and for including the output signal in the data being communicated to the receiving node selected from said plurality of nodes; and receiving means, operative when the node is acting as a receiving node, for extracting the output signal from the data being communicated, and for storing in said storage device the state of said transmitting node as indicated by said output signal, the node retaining details of the state of the transmitting node thereby enabling the node having said receiving means to use the stored state in subsequent communications with said transmitting node, whereby the output signal being ignored by the receiving node if the receiving node is said at least one node.

2. A computer network as claimed in claim 1, if a first node from said set of nodes communicates with a node whose state is not stored in the storage device of the first node, and the second node is one of said set of nodes, then upon receiving any communications back from the second node, the receiving means in the first node will extract the output signal included as part of the communication from the second node, thereby establishing the state of the second node, and will subsequently communicate with the second node using the second protocol.

3. A computer network as claimed in claim 1 or 2, wherein said output signal is placed in a previously redundant byte in the communications data sent from the transmitting node.

4. A method of operating a computer network having a plurality of nodes which communicates with each other over a network, a communication involving the transfer of data from a transmitting node to a receiving node, the plurality of nodes including a set of nodes programmed to communicate via a first or a second protocol, the plurality of nodes further including at least one node programmed to communicate via said first protocol but not said second protocol, and each node in said set comprising a storage device for storing states of the plurality of nodes, for each node in said set the method comprising the steps of:

accessing the storage device for determining the state of the receiving node when each node is said set is acting as a transmitting node;

(a) if the state of said receiving node in the storage device is not known, or the state indicates that the receiving node is said at least one node, the communication protocol is the first protocol;

(b) if the state of the receiving node is a member of said set, the communication protocol is the second protocol;

producing an indication means, operative when the node is acting as a transmitting node, for producing an output signal indicating state of the transmitting node, and for including the output signal in the data being communicated to the receiving node selected from said plurality of nodes; and extracting the output signal from the data being communicated with a receiving means, operative when the node is acting as a receiving node, and for storing in said storage device the state of said transmitting node as indicated by said output signal, the node retaining details of the state of the transmitting node thereby enabling the node having said receiving means to use the stored state in subsequent communications with said transmitting node, whereby the output signal being ignored by the receiving node if the receiving node is said at least one node.

5. A method as claimed in claim 4 wherein, if a first node from said set of nodes communicates with a node whose state is not stored in the storage device of the first node, and the second node is one of said set of nodes, then upon receiving any communications back from the second node, the receiving means in the first node will extract the output signal included as part of the communication from the second node, thereby establishing the state of the second node, and will subsequently communicate with the second node using the second protocol.

* * * * *